May 30, 1950 J. B. THOMSON 2,509,749
BALL BEARING FOR LINEAR MOTION
Filed June 7, 1946 2 Sheets-Sheet 1

INVENTOR
JOHN B. THOMSON
BY
Emery, Varney, Whittemore & Dix
ATTORNEYS

May 30, 1950   J. B. THOMSON   2,509,749
BALL BEARING FOR LINEAR MOTION
Filed June 7, 1946   2 Sheets-Sheet 2

INVENTOR
JOHN B. THOMSON.
BY
Emery, Varney, Whittemore & Dix
ATTORNEYS

Patented May 30, 1950

2,509,749

UNITED STATES PATENT OFFICE 2,509,749

BALL BEARING FOR LINEAR MOTION

John B. Thomson, Plandome, N. Y.

Application June 7, 1946, Serial No. 675,247

5 Claims. (Cl. 308—6)

In a patent application filed by me concurrently herewith Serial No. 675,248, filed June 7, 1946, I have illustrated and described a ball bearing for linear motion (and several modifications thereof), the principal object of the invention in that case being to design a bearing to meet the present need of an anti-friction bearing for linear motion which can be manufactured at relatively low cost in comparison with the designs heretofore proposed for this type of bearing.

My present invention has the same ultimate object in view, namely, to reduce the cost of manufacture of this type of bearing. In the present case, this object is accomplished, in part, by the manner in which I produce the ball-race member of the bearing (which manner of production is also applicable to the production of the ball-race member of the bearing of my aforesaid application and would produce the ball-race member there as a single piece, instead of in sections as there shown), and, in part, by the elimination of the ball guiding and retaining sleeve of the bearing of my aforesaid application which I am able to omit from my present bearing because of the manner hereinafter described of assembling, shipping and installing my present bearing.

Figure 1:
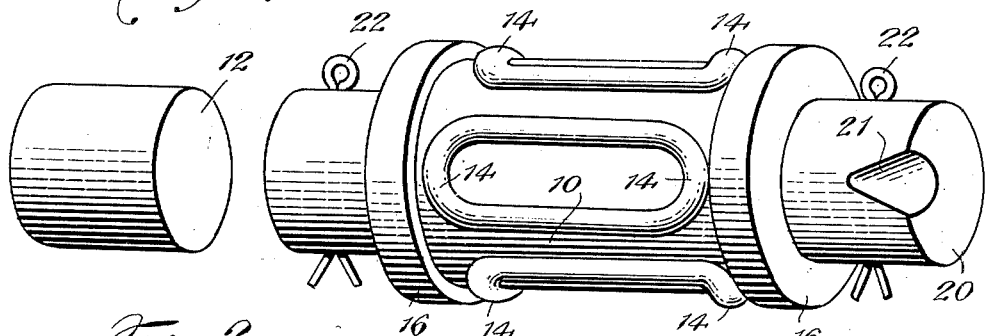
Figure 2:
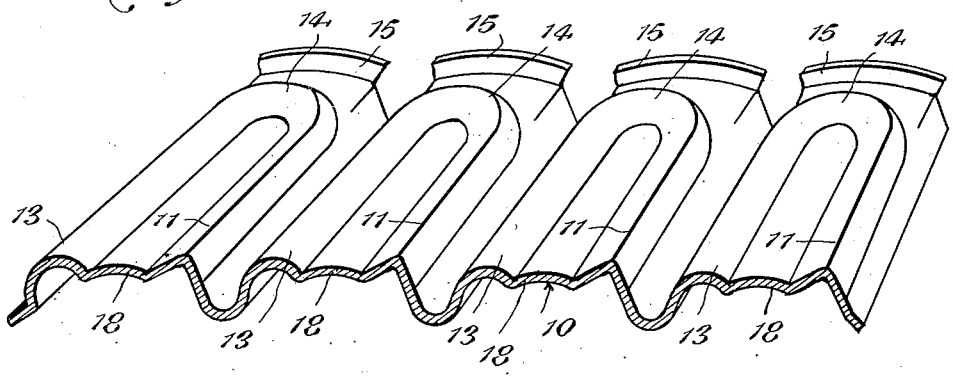
Figure 3:
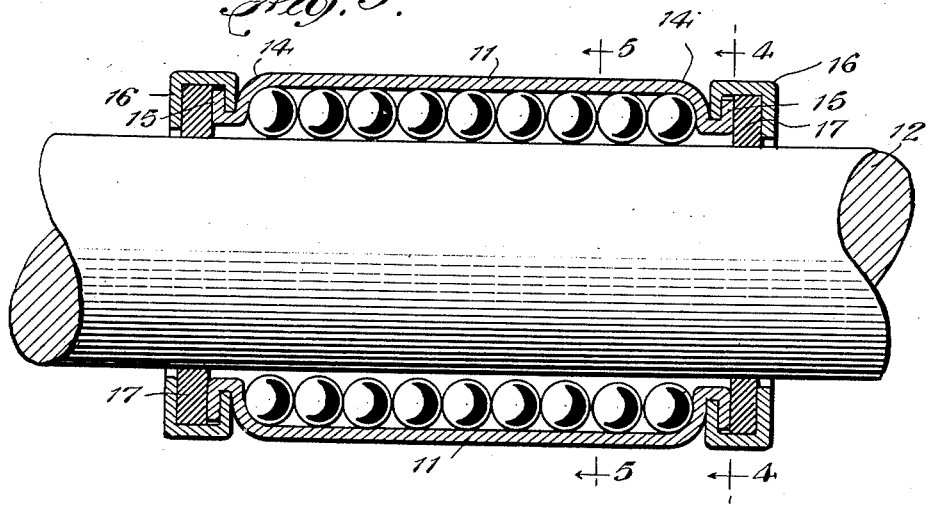
Figure 4:
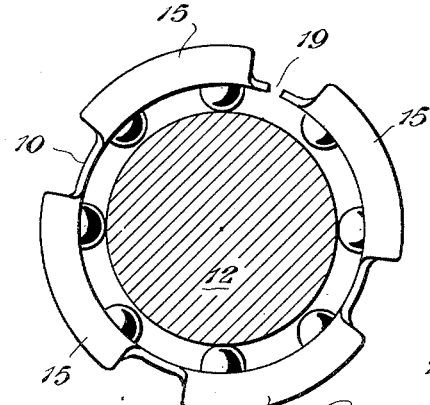
Figure 5:
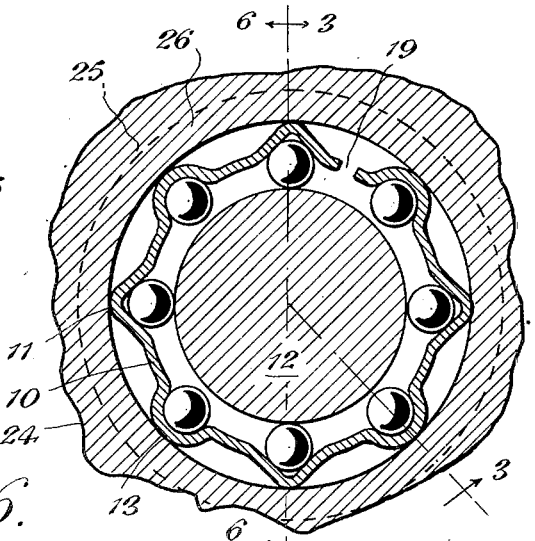
Figure 6:
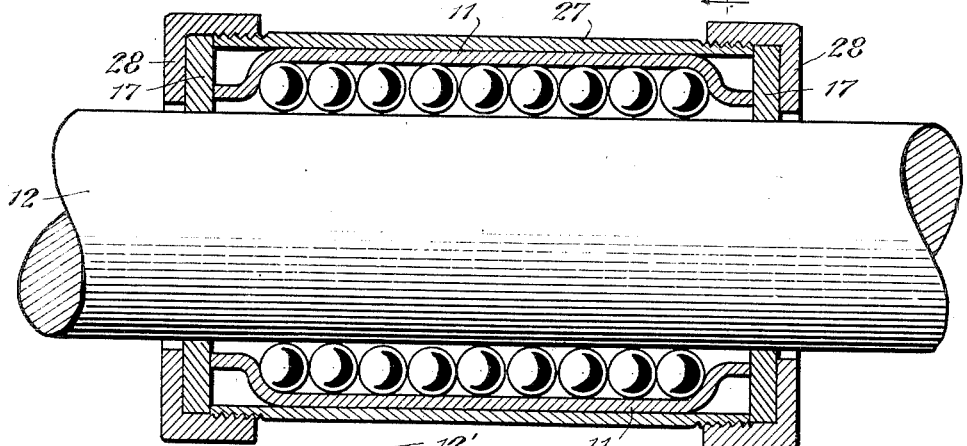
Figure 7:
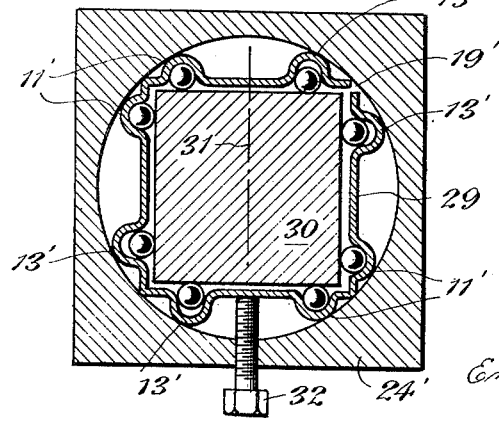

In the accompanying drawings, Fig. 1 is a perspective view of one embodiment of my present bearing applicable to a cylindrical shaft and shown as mounted on a temporary shaft or plug usable for assembling, shipping and installing my bearing; Fig. 2 is an enlarged perspective (broken) view of a metal strip of suitable bearing steel after it has been stamped out to form the ball-race member of the bearing of Fig. 1 and before said strip has been bent into a cylindrical shell to be slipped over the cylindrical shaft with which it is to be used; Fig. 3 is a view partly in elevation and partly in longitudinal section (indicated by line 3—3 in Fig. 5) of said bearing installed on the shaft; Figs. 4 and 5 are transverse sections respectively indicated by the lines 4—4 and 5—5 of Fig. 3, some of the parts being omitted from Fig. 4 for convenience of illustration and Fig. 5 additionally showing the relation of the bearing to a housing within which it may be inserted for use; Fig. 6 illustrates a modification; and Fig. 7 is a transverse section of my bearing applied to a rectangular shaft and showing its relation to a cylindrical opening in a housing in which it might be inserted for use.

In Figs. 1 to 5 inclusive the ball-race member 10 is formed with a plurality of continuous oblong raceways and the balls in each of the straight portions 11 thereof have bearing contact with both the shaft 12 and the raceways while those in the other straight portions 13 are free balls. This is brought about by making the portions 11 of the raceways shallower than the portions 13 as by giving the portions 11 an angular shape in cross section, as shown, rather than a rounded shape like the deeper portions 13, whereby the balls, which substantially fill all of the raceways and are of such diameter as to be loosely held in said portions 13, will be forced against and held in bearing contact with the shaft when traversing said portions 11. At the curved portions 14 of the raceways, the interior faces of their shallower or angular portions gradually blend into the interior faces of their deeper or rounded portions.

The ball-race member 10 preferably has outwardly facing lips 15 which, in the assembled bearing are embraced by the inwardly facing channels of annular retaining members 16 at each end of the bearing (Fig. 3). These annular retaining members 16 may also hold sealing rings 17 for lubricating purposes. (In Fig. 4, the retaining members 16 and the rings 17 have been omitted for convenience in illustrating the remaining parts.)

In the manufacture of the ball-race member 10, I take a flat strip of a suitable bearing steel of the proper length to constitute the ball-race member when bent into the cylindrical, rectangular or other shape it must assume to conform generally to the exterior of the shaft upon which the bearing is to be used; and by means of a pair of reciprocating stamping dies having suitably formed matrices therein, I press or stamp the strip into the form shown in Fig. 2 (the broken-away part of the stamped-out strip in this figure to be understood as being formed similar to and symmetrical with the part shown). The stamped-out strip, as shown in that figure, has a plurality of integrally connected sections 18, each slightly concaved to fit the surface of a cylindrical shaft, and each having formed therein one of the continuous oblong raceways 11, 13, 14 heretofore referred to, and the longitudinal edges of the strip having the upwardly or outwardly turned lips 15 heretofore referred to. (These lips, however, are omitted in the embodiment of my bearing shown in Fig. 6.) Instead of using a pair of reciprocating dies to form the ball-race member, I may use a press having suitably shaped continuously rotating dies and feed strip thereto from a continuous roll of strip material.

The stamped-out strip is then bent end to end to shape it into a sleeve-like shell conforming generally to the exterior of the shaft upon which the bearing is to be used, but leaving a gap 19 (Fig. 5) between the ends of the bended strip so that the shell thus provided is discontinuous for a purpose to be described presently, although the strip used to form the ball-race member may, if desired, be long enough so that when bent end to end to form said shell its ends may abut, and even be secured together, without departing from the broader aspect of my invention. During the bending of the strip to produce the shell as just described, the strip, as formed by the dies and shown in Fig. 2, will flex very readily along transverse lines between its adjacent sections, due to the concavity of the sections and particularly to the reinforcement thereof by the upwardly facing lips 15.

In assembling the bearing shown in Figs. 1, 3 and 4 (which is shaped for use on a cylindrical shaft) I first take the ball-race shell above described and collapse it slightly by sufficient pressure to close or partly close the gap 19 (Fig. 5) so that the annular members 16, in which the sealing rings 17 have previously been placed, may be snapped over the lips 15 at each end of the bearing. Upon releasing the pressure, the shell will then spring back into place and assume the diameter governed by the inside diameter of the inner flanges of the channels of said annular members. It will be seen, therefore, that these annular members will determine the internal diameter of the bearing and also serve to prevent the bearing from springing apart, and together with the shaft will retain the balls in position and also act to retain the seal of the bearing for lubrication purposes. I next assemble the balls in the bearing; and for this purpose, I prefer to use a temporary shaft, such as a wooden plug 20 (Fig. 1) of the same shape and size as the shaft upon which the bearing is to be used, and having a notch 21 in its periphery at one end. This plug I insert in the bearing which has been assembled as previously described, and line up the notch 21 with one of the curved ends 14 of a raceway. Balls can now be introduced to fill up this raceway by dropping them into the notch, while the plug 20 is held vertically with the notch 21 at the top, whereupon the balls will roll down into the raceway and fill it up. After one of the raceways is filled, the plug is rotated so as to register with a curved portion of each raceway in succession and the operation of filling repeated. After all of the raceways are loaded, cotter pins 22 may be inserted in both ends of the plug to prevent the latter from slipping out of the bearing, whereby it will serve to retain the balls in their proper places during the shipment and marketing of the bearing and during storage thereof. When the bearing is ready for use, the cotter pin at one end is removed and that end of the plug is placed flush against one end of the shaft 12 on which the bearing is to be used, whereupon the bearing can be readily slid off the plug and onto the shaft. The plug can then be returned to the factory for re-use or may be retained by the consumer as a loading device to replace the balls if they should become lost or should spill out due to carelessness in disassembling the bearing.

Fig. 5 shows the bearing inserted within an external housing 24, with the exterior faces or edges of the ball-raceways abutting against the interior face of the housing. The housing, in such a case, provides a backing for the ball-race member to take the thrust of the bearing balls and thus counteracts any tendency of the ball-race member to expand radially. This enables the ball-race member to be made of very thin strip metal irrespective of the length of the bearing and notwithstanding that the bearing is subjected to heavy loads. And it will be understood, of course, that instead of inserting the bearing in a backing housing, the bearing itself may be provided with an exterior backing member as denoted by the hatched portion 26 within the broken line 25 of Fig. 5. It is of course obvious that where the bearing is to be used in a housing, the retaining members 16 and the outwardly projecting lips 15 may be omitted altogether, in which case the housing alone will act to prevent the ball-race member from springing away from the shaft and will also govern the diameter of the bearing.

In the embodiment of my bearing shown in Fig. 6, an exterior backing member 27 and end caps 28 are substituted for the annular channeled retaining members 16 and the lips 15 of the bearing hereinbefore described with reference to Figs. 1–5 inclusive.

In Fig. 7 where the ball-race member strip has been bent into a shell 29 to fit a rectangular shaft 30, with the gap 19' in the shell facing a corner-edge of the shaft in which two of its adjacent faces meet, and where the ball-race member has at least as many of the continuous oblong raceways as there are faces of the shaft, with at least one raceway disposed opposite each face of the shaft, the shallower straight portions 11' of the raceways are shown as curved in cross-section the same as the deeper straight portions 13', instead of being angular like the shallower portions 11 of the raceways shown in Fig. 5. Fig. 7 also shows this bearing inserted in a cylindrical opening of a housing 24' like that of the housing 24 of Fig. 5, to take the thrust of the bearing balls. A rectangular opening would, of course, serve the same purpose but could not be provided by a simple or single operation like boring a hole. Hence, to adapt the rectangular bearing shown in Fig. 7 for insertion in a cylindrical opening, I form the race member strip so that when bent into the shell 29 and assembled with the balls and shaft, the deeper straight portion 13' of each raceway will lie slightly nearer than its shallower straight portion 11' to the longitudinal center line of the corresponding face of the shaft. This will be evident by comparing the respective distances of the raceway portions 11' and 13' at the top of the shaft from the broken line 31 drawn through the center of the shaft perpendicular to its upper face. In this way, the exterior faces of all the straight portions will abut against the interior cylindrical face of the housing. To prevent the bearing from turning relatively to the housing a set screw 32 may be provided as shown.

I claim as my invention:

1. A ball bearing for linear motion comprising, for combination with a shaft, a ball-race member to surround the shaft and having a plurality of continuous oblong raceways formed therein the straight portions of which are disposed longitudinally of said member, and one of said straight portions being shallower than the other, balls substantially filling the raceways and of such diameter that those in the shallower portions of the raceways will have bearing contact with both the shaft and the raceways, and characterized by this: that said ball-race member consists of a strip of sheet metal bent end to end to form a sleeve-like shell and that means are provided to prevent the ball-race member from springing apart.

2. A ball bearing for linear motion comprising, for combination with a shaft, a ball-race member consisting of a strip of sheet metal bent to surround the shaft and having a plurality of continuous oblong raceways formed therein the straight portions of which are disposed longitudinally of the shaft, and one of said straight portions being shallower than the other, balls substantially filling the raceways and of such diameter that those in the shallower portions of the raceways will have bearing contact with both the shaft and the raceways, and an external housing member surrounding the ball-race member and against which the exterior faces of the shallower portions of the raceways bear to impart thereto the thrust of the bearing balls.

3. A ball bearing for linear motion comprising, for combination with a shaft, a ball-race member consisting of a strip of sheet metal bent to form a discontinuous sleeve-like shell surrounding the shaft and having a plurality of continuous oblong raceways formed therein the straight portions of which are disposed longitudinally of the shaft, and one of said straight portions being shallower than the other, balls substantially filling the raceways and of such diameter that those in the shallower portions of the raceways will have bearing contact with both the shaft and the raceways, and a retaining member around each end of the sleeve-like shell to prevent the shell from springing away from the shaft.

4. The bearing defined in claim 3 and further characterized by this: that the ends of the ball-race member have outwardly facing lips and the retaining members inwardly facing channels within which the lips are disposed to maintain the engagement of the retaining members with the ball-race member.

5. The bearing defined in claim 2 for combination with a rectangular shaft and whereof the ball-race member has at least the same number of oblong raceways as there are faces of the shaft with at least one raceway disposed opposite each face of the shaft, and further characterized by this: that the external housing member has a cylindrical inner face against which the exterior faces of all of the raceways abut, and that the deeper straight portion of each raceway lies nearer than the shallower straight portion thereof to the longitudinal center-line of the corresponding face of the shaft.

JOHN B. THOMSON.

REFERENCES CITED

The following references are of record in the file of this patent:

FOREIGN PATENTS

| Number | Country | Date |
|--------|---------|------|
| 304,229 | Italy | 1932 |
| 755,957 | France | 1933 |